US012769756B2

(12) United States Patent
Rajaram et al.

(10) Patent No.: US 12,769,756 B2
(45) Date of Patent: Oct. 20, 2026

(54) USER-DRIVEN CONTEXTUALIZATION FOR INTERFACE DATA QUERY SYSTEMS

(71) Applicant: Step Into AI Inc., Portland, OR (US)

(72) Inventors: Santoash Rajaram, Portland, OR (US); Karan Mishra, Glenview, IL (US)

(73) Assignee: Step Into AI Inc., Portland, OR (US)

( * ) Notice: Subject to any disclaimer, the term of this patent is extended or adjusted under 35 U.S.C. 154(b) by 0 days.

(21) Appl. No.: 18/913,765

(22) Filed: Oct. 11, 2024

(65) Prior Publication Data

US 2025/0124044 A1 Apr. 17, 2025

Related U.S. Application Data

(60) Provisional application No. 63/543,688, filed on Oct. 11, 2023.

(51) Int. Cl.
*G06F 16/25* (2019.01)
*G06F 16/2457* (2019.01)
*G06F 16/93* (2019.01)

(52) U.S. Cl.
CPC ...... *G06F 16/254* (2019.01); *G06F 16/24575* (2019.01); *G06F 16/93* (2019.01)

(58) Field of Classification Search
CPC .. G06F 16/254; G06F 16/24575; G06F 16/93; G06F 16/3329
See application file for complete search history.

(56) References Cited

U.S. PATENT DOCUMENTS 11,734,268 B2 8/2023 Nahamoo et al.
2005/0067482 A1* 3/2005 Wu ...................... H04N 1/2191 235/375
2024/0370479 A1* 11/2024 Hudetz ................. G06F 16/316
2025/0045525 A1* 2/2025 Enomoto ................ G06F 40/30

* cited by examiner

*Primary Examiner* — Charles Rones
(74) *Attorney, Agent, or Firm* — CM Law LLP; Michael P. Dunnam

(57) ABSTRACT

A document processing platform transforms unorganized documents into interactive systems where users can ask questions and get answers. The document processing platform implements a User-Driven Contextualization Process, which allows users to add meaning to data. The process also improves user productivity by automatically tagging information and allowing for the prioritization of relevant details. The user may then ask questions for which narrative answers are provided including the relevant details extracted from the document. The process of transforming an unorganized document into an interactive system where users can ask questions and receive answers is broken down into three phases including document upload and data extraction, user-driven contextualization and definition, and configuring the new documents for questions using a large language model such as OpenAI.

35 Claims, 5 Drawing Sheets

USER-DRIVEN CONTEXTUALIZATION FOR INTERFACE DATA QUERY SYSTEMS

CROSS-REFERENCE TO RELATED APPLICATIONS

The present application claims priority to U.S. Provisional Patent Application No. 63/543,688, filed Oct. 11, 2023, entitled "User-Driven Contextualization for Interactive Data Query Systems." The contents of that patent application are hereby incorporated by reference.

TECHNICAL FIELD

This disclosure describes systems and methods for transforming unorganized documents into interactive systems where users can ask questions about the documents and receive contextualized answers.

BACKGROUND

Unorganized documents, such as insurance documents, often encompass vast swathes of unstructured data, making it challenging to extract, interpret, and apply meaningful context for actionable insights. Existing systems, such as the document pre-processing system described in U.S. Pat. No. 11,734,268, process a source document to produce contextual information representative of the structure and content of the source document and transform the document using the contextual information to generate a question-and-answer searchable document. However, such systems confine contextual adjustments to the development phase, and the user does not provide insights into desired contextual adjustments to the document data during the development of the answers to the queries, thus limiting the flexibility and adaptability of the data interpretation process.

SUMMARY

Various examples are now described to introduce a selection of concepts in a simplified form that are further described below in the Detailed Description. This Summary is not intended to identify key or essential features of the claimed subject matter, nor is it intended to be used to limit the scope of the claimed subject matter.

The systems and methods described herein introduce a document processing platform that transforms unorganized documents into interactive systems where users can ask questions and get answers. The document processing platform implements a User-Driven Contextualization Process, which allows users to add meaning to data. The process also improves user productivity by automatically tagging information and allowing for the prioritization of relevant details. The user may then ask questions for which narrative answers are provided including the relevant details extracted from the document. The process of transforming an unorganized document into an interactive system where users can ask questions and receive answers is broken down into three phases including document upload and data extraction, user-driven contextualization and definition, and configuring the new documents for questions using a large language model such as OpenAI.

In sample configurations, a system for querying a document is provided that includes a document storage for storing documents, a context storage for storing context data for the documents, a user interface that enables a user to upload a document to the document storage, text and data extraction software that processes the uploaded document to detect, extract, and auto-tag text and data from the document, a large language model that creates and presents a narrative version of the extracted and auto-tagged text and data from the document in the user interface, and a document processing system. The document processing system is adapted to enable the user to interact with the narrative version of the extracted and auto-tagged text and data from the document in the user interface by posing a user question through the user interface against the whole document or specific blocks of the document to obtain a response and to add or refine context of the extracted and auto-tagged text and data in the form of a question-answer pair until a contextualized response to the user question is obtained.

In sample configurations, the large language model incudes a vector database adapted to handle vector data. After the narrative version of the extracted and auto-tagged text and data is generated for each block of text and data from the document, the document processing system communicates with the large language model to obtain embeddings for the narrative version of the extracted and auto-tagged text and data and stores the embeddings in the vector database of the large language model.

In the sample configurations, the text and data extraction software converts at least portions of the text and data from the document into a character separated values (CSV) format and presents processed text and data from the document as key-value pairs. The text and data extraction software further extracts keywords from each narrative block of the narrative version to ascertain main themes or subjects of each narrative block, auto-tags keywords from each narrative block using the large language model, and stores the keywords with an associated narrative block of the narrative version in a database. The document storage may further store metadata about each document that is used in retrieval and organization of text and data extracted from each corresponding document.

In further sample configurations, the large language model encodes the narrative version of the extracted and auto-tagged text and data from the document and user questions into vectors using embeddings from an embedding library and calculates cosine distances between vectors of the user questions and narrative blocks of the narrative version of the extracted and auto-tagged text and data from the document using a mathematical library to gauge similarity between the user question and narrative blocks of the narrative version of the extracted and auto-tagged text and data from the document. The large language model also may generate contextual prompts in the user interface for an interface to the large language model. A most proximate narrative block, determined through the embeddings, may be used as a contextual prompt when the user is interacting with the large language model to produce the contextualized response to the question.

In other sample configurations, a database may be provided for storing feedback and context and an embedding library may be provided for reassessing narrative blocks of the narrative version of the extracted and auto-tagged text and data from the document. Then, when the user inputs new context via the user interface, all narrative blocks may be evaluated in terms of their similarity to the user question posed through the user interface and relevant narrative blocks may be subjected to feedback-triggered context regeneration while other narrative blocks remain unaltered. The relevant narrative blocks may be used as context for generating an answer to the user question posed through the user interface using the large language model.

In still other configurations, the uploaded document is organized as a module in the document storage and the user interface enables the user to upload a new document relative to the module and to ask a further user question against the new uploaded document with a context linked to the module to generate a further contextualized response.

Other configurations of the system described herein may include at least one of a machine learning model, a large language model, or relational database management system associated with document modules to predict relevant information to extract for a new document and a recommendation model that is trained by each question that a user asks against documents in a document module. The recommendation model predicts the kinds of questions that users are likely to ask for the new document. Such a system may include a data structure that stores configuration information for at least one artificial intelligence (AI) assistant, the configuration information including a unique identifier for each AI assistant; a field for storing organization-specific knowledge in a structured format; an array or list to hold rules defining AI assistant limitations; a collection of feedback entries, each containing a timestamp, feedback type, and content; and a field for behavior instructions as situation-response pairs.

In still other configurations, the user interface is adapted to enable the user to at least one of input and organize domain knowledge; add, edit, and delete rules; provide and view feedback; or define situation-response pairs. In such configurations, the user interface may include a web-based dashboard adapted to implement at least one of a rich text editor that enables the user to input and organize domain knowledge, create a form interface where the user can add, edit, and delete rules, provide and view feedback, or implement behavior instructions using a form where the user defines situation-response pairs.

The system described herein also may include a backend server that supports functionality of the user interface. The backend server may include a parser that converts user-input knowledge into a structured, searchable format and a vector embedding system that creates searchable representations of the domain knowledge. The backend server also may include a pre-processing module that checks user queries against defined rules before passing the user queries to an AI assistant and a post-processing module that validates the AI assistant's responses against the defined rules before sending the AI assistant's responses to the user. The backend server may further include a reinforcement learning model that adjusts the AI assistant's behavior based on accumulated feedback and a pre-trained language model that converts each defined situation in the behavior instructions into a vector embedding and that stores situation embeddings along with corresponding desired responses in a configuration file of the AI assistant. In such embodiments, when a behavior instruction relevant to a defined situation is found, it may be used to guide the large language model in generating an appropriate response by using the behavior instruction relevant to the defined situation as a prefix or prompt for the large language model or as a post-processing step to refine output of the large language model.

In yet other configurations, a contextual widget may be provided that is deployed based on the contextualized response to the user question. The contextual widget may enable the user to tweak properties including at least one of height, width, or color schemes or to automatically read data displayed on a display screen and to pull a document related to data in the read data that is of interest to the user.

The scope of the present disclosure further includes methods performed by the apparatus and computer-readable media containing instructions that, when executed, perform operations for implementing such methods. The features of such methods result from the functionality of the apparatus. Also, the explanations provided for each aspect and its implementation apply equally to the other aspects and the corresponding implementations. The different configurations may be implemented in hardware, software, or any combination thereof. Also, any one of the foregoing examples may be combined with any one or more of the other foregoing examples to create a new configuration within the scope of the present disclosure.

DETAILED DESCRIPTION OF THE DRAWINGS

The foregoing and other beneficial features and advantages of the subject matter described herein will become apparent from the following detailed description in connection with the attached figures, of which:

DETAILED DESCRIPTION OF ILLUSTRATIVE CONFIGURATIONS

Figure 1:
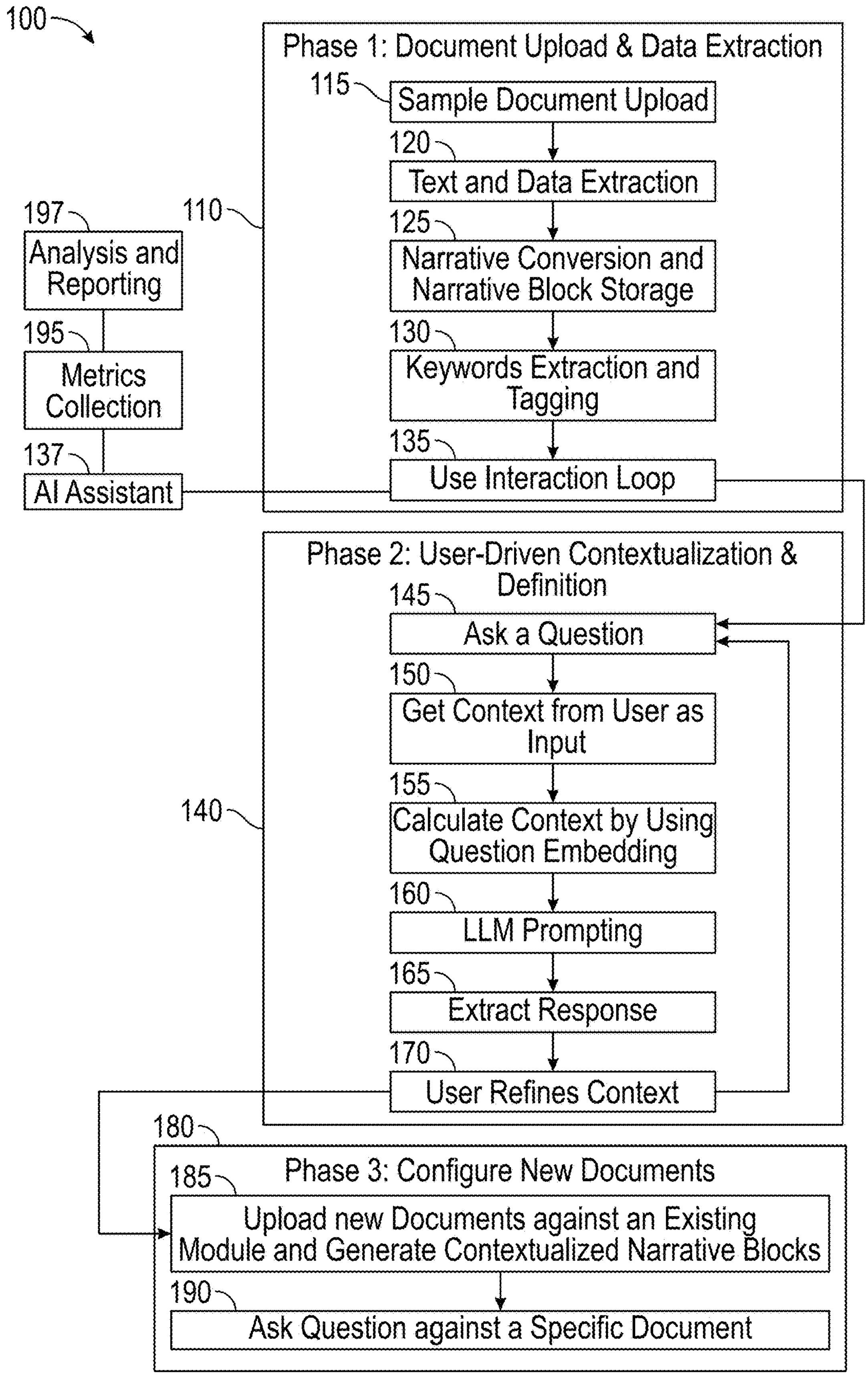
FIG. 1 is a flow chart illustrating the user-driven contextualization process of the data query system in a sample configuration.

Sample configurations will be described with respect to FIGS. 1-4 for use in transforming an unorganized document into an interactive system where users can ask questions and receive answers, although those skilled in the art will appreciate that the teachings provided herein may be used for other purposes such as transforming other forms of data (e.g., video and audio) that may be converted to text for user inquiry. Such configurations are intended to be within the scope of the present disclosure.

Process Steps

In a sample configuration, the process of transforming an unorganized document into an interactive system where users can ask questions and receive answers is broken down into three phases. Phase 1 comprises document upload and data extraction; Phase 2 comprises user-driven contextualization and definition; and Phase 3 comprises configuring the new documents for questions. Additional phases may be added for performance monitoring of an artificial intelligence assistant (Phase 4) and contextual widget deployment (Phase 5). Each phase will be described in turn below with respect to the flow chart of the data query system 100 shown in FIG. 1, which shows the flow that users use to add context to the language models.

Phase 1: Document Upload & Data Extraction

The objective of first phase 110 of the document processing is twofold. First, the data query system 100 transforms unstructured document data into structured or semi-structured forms. Second, this data is rendered in a narrative style to make it more comprehensible to end-users. To accomplish these steps, users are enabled to upload their documents onto the document processing platform described herein. Algorithms implemented by the document processing platform then swiftly detect, extract, and auto-tag data sections and data points. This extracted data represents the raw data from the document. The users are presented with the raw data and the narrative version of that data in the user interface. This automated step sets the groundwork by sifting through vast amounts of unstructured data to extract the data and to create a narrative text that is used for further processing of the existing documents or new documents in the subsequent steps.

In phase 1 (110), the sample document is uploaded at 115 via a web-based user interface with secure storage solutions. For example, Amazon S3 or similar technologies may be used for uploading and storing the uploaded documents. The user interacts with the user interface to upload their desired documents onto the document processing platform. The uploaded documents are organized as modules.

At 120, text and data are extracted from the uploaded documents using, for example, Amazon Textract or similar OCR (Optical Character Recognition) solutions. Tables encountered within the documents may be converted into a CSV (character separated values) format. This structured representation allows for easier parsing and transformation in subsequent steps. Forms may be processed to yield key-value pairs, capturing the essence of structured form entries without redundancy. All other textual content from the documents may be extracted line by line to ensure granularity and maintain context.

The data also may be extracted at 120 using machine learning models, large language models (LLMs), relational database management systems (RDBMS), and the like. For example, a pre-trained machine learning model associated with the document modules may be used to predict relevant information to extract for new documents. In such cases, each question that a user asks against documents in a module will be used to train a recommendation model that can be used to predict the kind of questions that users are likely to ask for newer documents. Thus, to make it easier for users, the document processing platform may automatically extract relevant data that is stored against each document and which will then be readily available for users when they pull up this document.

At 125, the document narrative is converted using, for example, custom script (e.g., Python or JavaScript). The CSV data and key-value pairs, which are inherently structured, are converted into narrative formats. For instance, a CSV row containing [Name, John; Age, 30; Occupation, Engineer] might be rendered as "John is a 30-yearold Engineer." Such narrative conversion aids in making the data more intuitive and user-friendly so as to bridge the gap between raw data and human understanding. Relational database management systems such as PostgreSQL may be used to store the narrative blocks, which are essentially chunks of data rendered in natural language, in a database. Metadata about the document (like upload date, source, type, etc.) also may be extracted and stored to aid in retrieval and organization of the extracted data.

At 130, keywords may be extracted from the data and auto-tagged using, for example, large language models like OpenAI or openLLAMA, Natural Language Processing (NLP) libraries like NLTK, spaCy, etc. From each narrative block, the keywords may be extracted to ascertain the main themes or subjects of the block. These keywords will be auto-tagged and stored alongside the associated narrative block in the database. This functionality empowers users to conduct swift and accurate searches, pulling up relevant narrative blocks based on their queries.

A user interaction loop 135 may be implemented in sample configurations. The user interaction loop may comprise, for example, an artificial intelligence (AI) Assistant Management Framework that uses an LLM like OpenAI or LLAMA3 and a relational database to design a data structure named "AssistantConfig" to store configuration information for one or more AI assistants 137. This structure may include a unique identifier for each AI assistant 137; a field for storing organization-specific knowledge in a structured format (e.g., JSON); an array or list to hold rules defining AI assistant limitations; a collection of feedback entries, each containing a timestamp, feedback type, and content; and a field for behavior instructions as situation-response pairs.

In sample configurations, the AI Assistant Management Framework may be used to develop a user interface including a web-based dashboard with the following features:

i. Knowledge management is implemented by a rich text editor that allows users to input and organize domain knowledge. This rich text editor should support formatting, linking, etc.

ii. Rule setting is performed by creating a form interface where users can add, edit, and delete rules. Each rule should be a clear, concise statement of what the assistant is not allowed to do.

iii. A feedback system is provided via the user interface for providing and viewing feedback. The user interface may include options for positive and negative feedback and allow for detailed comments.

iv. Behavior instructions are implemented using a form where users can define situation-response pairs. The form should include a field for describing the situation and another for the desired response or behavior.

The AI Assistant Management Framework of the user interaction loop 135 also may provide backend logic to a backend server that supports the functionality of the user interface. For example, the backend logic may implement features including:

i. Knowledge Integration is implemented using a parser that converts user-input knowledge into a structured, searchable format. A vector embedding system may be implemented that uses models like Bidirectional Encoder Representations from Transformers (BERT) or a Universal Sentence Encoder to create searchable representations of the knowledge base.

ii. Rule Enforcement is implemented by a pre-processing module that checks user queries against the defined rules before passing them to the AI assistant 137. A post-processing module validates the AI assistant's responses against the defined rules before sending the AI assistant's responses to the user.

iii. Feedback Incorporation is implemented by a reinforcement learning model that adjusts the AI assistant's behavior based on accumulated feedback. A periodic retraining process is set up that incorporates new feedback to continually improve the performance of the AI assistant 137.

iv. Behavior Instruction is implemented by converting each defined situation in the behavior instructions into a vector embedding using a pre-trained language model (e.g., BERT, a Robustly Optimized BERT Pretraining Approach (ROBERTa), or a fine-tuned domain-specific model). These situation embeddings are stored along with their corresponding desired responses in the AssistantConfig. Then, when processing a user query, the user query is converted into a vector embedding using the same embedding model. The cosine similarity between the query embedding and all stored situation embeddings is computed. Then, if the highest similarity score exceeds a predetermined threshold (e.g., 0.85), the corresponding desired response is retrieved. A response generation system also may be developed that incorporates the retrieved behavior instruction. If a relevant behavior instruction is found, it is used to guide the LLM in generating an appropriate response. This could involve using the instruction as a prefix or prompt for the LLM, or as a post-processing step to refine the LLM's output. On the other hand, if no relevant behavior instruction is found, the system proceeds with the standard LLM response generation. In addition, a continuous learning mechanism may be implemented by periodically reviewing the effectiveness of behavior instructions by analyzing user feedback on responses where instructions were applied and providing an interface for users to refine existing behavior instructions or add new ones based on this feedback.

The AI Assistant Management Framework of the user interaction loop 135 may be integrated into existing data extraction systems by modifying an existing LLM processing step to incorporate the new AI Assistant Management Framework. The process should follow the steps of retrieving the relevant AssistantConfig for the AI assistant 137 current interaction using an OCR of the background screen or by connecting the identification of the document to pull for the current context at runtime. Relevant knowledge is fetched from the knowledge base of the AI assistant 137 based on the user query. The data query system 100 then checks if the user query violates any defined rule and generates an initial response using the LLM, incorporating the relevant knowledge. Behavior instructions are applied to refine the response if a matching situation is identified. Finally, the final, contextualized response, is returned to the user.

Thus, Phase 1 (110) combines advanced text extraction with creative data rendering methods to convert data in a document into narratives that are easy to track and to interact with.

Phase 2: User-Driven Contextualization & Definition

The second phase (140) enables users to interact with the narrative data generated in phase 1 (110). Users are enabled to access and navigate through the document processing platform to engage with the contextualized (narrative) data generated in phase 1 (110). This narrative version is a readable transformation of raw data points. An interactive question-answer mechanism enables user to pose questions through an intuitive interface against the whole document or specific blocks to obtain the data query system's response. If the data query system's response does not meet expectations or lacks accuracy, the users are provided with the ability to enhance the data query system's understanding by directly adding or refining context in the form of question-answer pairs.

The data query system 100 uses adaptive learning to evolve and adapt based on user interactions, making it more attuned to the specific requirements of its users with each engagement. By allowing users to provide context and pose questions, the data query system 100 is guided to furnish responses that are both accurate and rooted deeply in context, maximizing its value to the end user.

The user-driven contextualization and definition is implemented using a data model that provides narrative block storage and user-provided context storage. For the narrative block storage, the Table/Collection of narrative blocks may be stored in a format including, for example:

BlockID: Unique identifier;
DocumentID: Links back to original document;
ModuleType: Modules are used to organize documents whereby all documents under a module will use the same context;
BlockContent: Narrative content;
Keywords: Auto-extracted tags; and
EmbeddedVector: Vectorized block content for similarity calculations.

On the other hand, the user-provided context storage may store the Table/Collection of context entries in a format including, for example:

ContextID: Unique identifier;
Question: User question;
Answer: User-provided answer;
RelevantBlockIDs: Blocks related to this context; and
EmbeddedVector: Vectorized representation of the question answer pair.

Processing logic is implemented in Phase 2 to provide embedding and distance calculation using embedding libraries such as Word2Vec, GloVe, or FastText and mathematical libraries (like SciPy) for cosine distance calculation. The narrative data and user questions are encoded into vectors using embeddings. The cosine distance helps gauge the similarity between a user's question and existing narrative blocks so as to ensure that relevant context is utilized.

In Phase 2, contextual prompt generation is provided for Large Language Models (LLM) interfaces (like OpenAI GPT series). The most proximate narrative blocks, determined through the embedding process, serve as contextual prompts when interacting with the LLM. This ensures the LLM receives and processes the most relevant information to produce a response.

Feedback-triggered context regeneration is provided using database solutions for storing feedback and context and embedding libraries for reassessing narrative blocks. When users input new context, all narrative blocks are evaluated in terms of their similarity to this question. Relevant blocks undergo a context regeneration process, while others remain unaltered.

As shown in FIG. 1, the user-driven contextualization and definition is provided via a user interface that enables a user to ask a question at 145. Context from the user is provided as input at 150, and the question embedding and similarity (context) is calculated at 155. LLM prompting at 160 elicits a response from the user at 165. The user may refine the context at 170 and then loop back to ask a new question at 145. This process may be repeated until the system has sufficient contextualization to provide the appropriately contextualized response.

Phase 3: Query New Documents

With the establishment of context and definitions in Phase 2, users are primed to input and configure new documents in Phase 3 (180) that correspond to an existing module type. These documents, once ingested, can be subjected to a series of processing stages.

For example, as shown in FIG. 1, at 185 the document processing platform uploads new documents against an existing module and generates contextualized narrative blocks as in Phase 1 (110) described above and further enables a user to ask a question against a specific document at 190. Thus, the document processing platform's evolved capacity allows users to pitch queries against the new documents. Given the foundational context and intricate linkages, responses generated are not just data-driven but they are deeply contextual and aligned with the document's essence.

The data query system's modular approach means it can effortlessly scale to accommodate new document types, all while maintaining the integrity of its contextual frameworks. Leveraging the layers of context from previous phases ensures that user queries are met with responses that resonate deeply with the document's content, promoting clarity and actionable insights. Also, given the capability to question specific documents or a collection of them, users can derive nuanced answers that might differ based on the document's context, enhancing the depth of their insights.

A module-type configuration is used in Phase 3 (180) to ensure that the context and definitions developed in Phase 2 (140) can be applied to similar or new document types. A database table or collection (e.g., named ModuleConfig) may be used to store each configuration with fields like ModuleTypeID, ModuleName, and AssociatedContext. In sample configurations, the document database structure may include a format for the table/collection documents such as:

DocumentID: Unique identifier for each document;

ModuleTypeID: Identifier linking back to the module type it belongs to, ensuring the correct context is applied;

DocumentContent: Actual content of the document;

DocumentType: Field to distinguish between sample documents from Phase 2 and new user-uploaded documents; and Status: To monitor the processing stage of the document. Potential statuses include text_extraction_pending, narrative_block_generation, contextualized, and errored.

On the other hand, the query processing mechanism may include a database structure for Table/Collection UserQueries in a format such as:

QueryID: Unique identifier for each query;

UserID: Identifier for the user posing the question;

AssociatedDocumentIDs: List of DocumentIDs that the query is pitched against;

UserQuestion: The actual question posed by the user; and

GeneratedResponses: Stored responses for each associated document, postprocessing.

In sample configurations, when a user submits a query against a set of documents, the document processing platform described herein uses the context linked to each document's ModuleTypeID to generate a contextual response. The embedded vectors of the question and the document's narrative blocks are compared using cosine similarity to find the most relevant blocks. These relevant blocks serve as context for generating a precise answer using the LLM. Each generated response is stored in GeneratedResponses for reference and quick retrieval. Each question and its response is stored in a table called QuestionAnwerLog that will allow a machine learning model to be trained to learn the kind of questions that will be asked for a given DocumentType.

A monitoring tool may be used to implement a dashboard or logging mechanism to monitor the status of each document. This aids in quickly identifying errored documents and understanding bottlenecks or issues. Retry mechanisms may be implemented for error resolution, especially for statuses like text_extraction_pending and narrative_block_generation. For documents that remain in the errored status, manual intervention or user notifications can be set up.

Those skilled in the art will appreciate that the document processing platform described with respect to FIG. 1 shifts power from developers to users. Unlike existing systems that entangle context in the developmental phase, necessitating model retraining for modifications, the document processing platform described herein offers users a no-code tool, allowing iterative, on-the-fly refinements. By availing control over the training and application process, the document processing platform described herein ensures that the answers gleaned from the documents remain congruent with the user's evolving needs. Providing users with such a user-driven contextualization process provides heightened efficiency, flexibility, and adaptability in interpreting and applying unstructured document data, such as insurance document data.

Phase 4: AI Assistant Performance Monitoring

The system described above may be supplemented with a metrics collection system 195 (FIG. 1) that, during operation, implements a robust data collection pipeline to capture various performance indicators of the AI Assistant 137 such as average response time, quality score, error rate, peak usage times, cost saved, compliance score, knowledge base coverage, user satisfaction rating, response confidence score, and first-time resolution rate. For example:

i. To capture average response time, a logging system may record timestamps for query receipt and response delivery and calculate the time difference and store it with each interaction.

ii. To capture the quality score, an automated evaluation system may be implemented that assesses responses based on predefined criteria (e.g., relevance, accuracy, completeness) and schedules a periodic job (e.g., daily) to process recent interactions and assign quality scores.

iii. To capture the error rate, a flagging system may be implemented that allows users to mark incorrect responses and to calculate the percentage of flagged responses over total interactions.

iv. To capture peak usage times, query timestamps may be aggregated into time slots (e.g., hourly buckets) and this data used to generate usage heatmaps and to identify peak periods.

v. To capture cost saved, for each query the number and types of documents accessed is logged. A calculation model estimates time saved compared to manual processing. AI processing time and costs are factored in for a net savings estimate.

vi. To capture the compliance score, a compliance checker is implemented that evaluates responses against configured regulations. A compliance score is assigned to each response and the average is tracked over time.

vii. To capture knowledge base coverage, which parts of the knowledge base are accessed for each query are tracked and reports are generated on rarely used or overused sections.

viii. To capture a user satisfaction rating, a simple rating system (e.g., 1-5 stars) may be implemented for users to rate responses. Average ratings are calculated and tracked over time.

ix. To capture a response confidence score, the LLM may be modified to provide a confidence score with each response. This score is tracked over time and correlated with actual accuracy and user feedback data.

x. To capture a first-time resolution rate, a system may be implemented to track follow-up questions for the same query. The percentage of queries resolved in the first interaction is then calculated.

The captured metrics may be stored in a data storage structure that efficiently stores and retrieves these metrics. In a sample configuration, a time-series database may be used for better performance with time-based data.

An analysis and reporting system 197 (FIG. 1) also may be implemented to process the collected data to generate insights. The analysis and reporting system 197 may implement statistical analysis tools to identify trends and patterns and create visualization components for each metric (e.g., line charts, heat maps, pie charts). A dashboard may be used to present these visualizations in an intuitive, customizable interface.

Phase 5: Contextual Widget Deployment

The system described herein may be modified to deploy contextual widgets. In a sample configuration, the widgets may be developed using web development frameworks (e.g., React, Vue.js, Electron) for desktop applications. For example, a lightweight, embeddable widget may be deployed that can be easily integrated into web applications, desktop software, or browser extensions. Preferably, the widget has a small footprint and does not significantly impact the performance of the host application.

In sample configurations, a screen scanning and data recognition widget may use OCR libraries (e.g., Tesseract), Computer Vision libraries (e.g., OpenCV), and API integrations to implement screen scanning functionality for applications where direct data access is not available. API integrations may be developed for common enterprise software to directly access displayed data when possible. A robust entity recognition system may be created to identify key information (e.g., policy numbers, claim IDs, customer names) from scanned or accessed data.

In other configurations, a context matching algorithm widget may use LLMs, Machine Learning libraries (e.g., scikit-learn, TensorFlow), and Vector databases (e.g., Faiss, Annoy, Pinecone) to identify information relevant to identify the document processed by an AI assistant 137. A relevant question may be created with the identified information (e.g.: help me find a claim with number CF1231234 belonging to a claimant John Doe with an effective date of Jan. 3, 2024). Using the embedding of this question, the closest (cosine similarity) document that can be found in a data repository of an AI assistant 137 is extracted.

In further configurations, an embeddable user interface widget may use React or Vue.js components and CSS frameworks (e.g., Tailwind CSS) to allow users to configure a widget for a given AI assistant 137 in the document processing platform. Users may tweak properties like height, width, color schemes, etc. like other chatbot platforms. In addition, the embeddable user interface widget may allow users, if the chatbot can read the data in the screen behind, to automatically pull the related documents that the users will be interested in. At the end of this session, the document processing platform of the data query system 100 will output a widget html code like this:

```
<askyourdata-widget origin="askyourdata.io" uid="t"
sid="7929601a-9946-4b7b-9d18-ad93f526acd1" allowscreenscan=true background = "rgb(23, 23,
23)" color = "rgb(255, 255, 255)" ></askyourdata-widget>

<script type="text/javascript" src= "https://askyourdata.io/assets/js/askyourdata-widget.
js"></script>
```

Architecture

Figure 2:
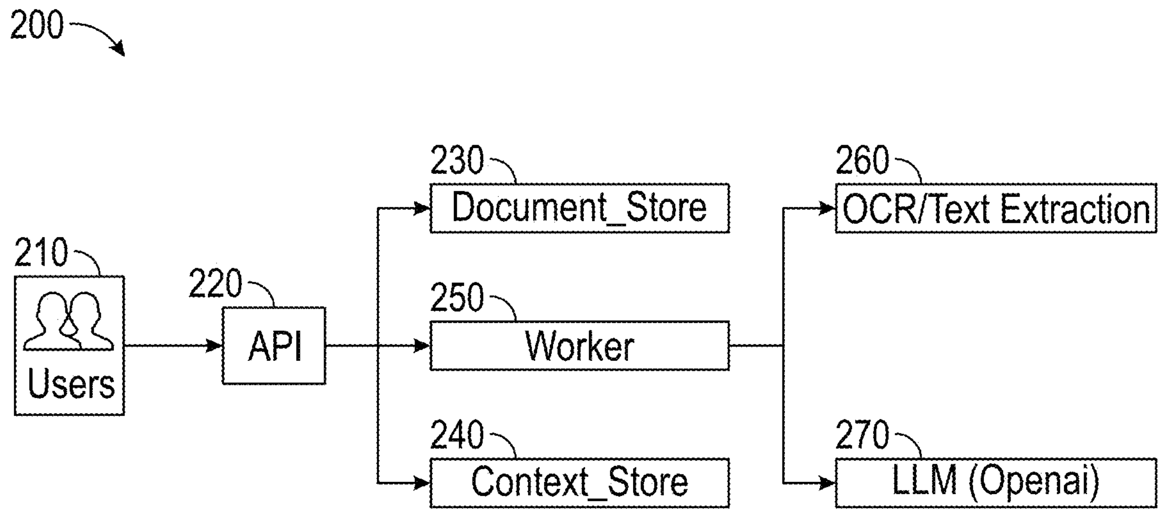
FIG. 2 illustrates a sample architecture for generating an interactive data query system of the type shown in FIG. 1.

FIG. 2 illustrates a sample document processing platform architecture 200 that generates an interactive data query system 100 of the type shown in FIG. 1. As illustrated in FIG. 2, users 210 interact via an application programming interface 220 (e.g., user interface) with storage and processing elements for implementing the functionality described with respect to FIG. 1. In a sample configuration, the storage elements include a document storage (document_store) 230 and a context storage (context_store) 240, while the processing elements include a worker program 250 that interacts with OCR/text extraction software 260 and LLM (e.g., OpenAI) 270 to provide the functionality described above with respect to the flow chart of FIG. 1.

The document_store 230 serves as the primary storage unit for uploaded documents. When a user uploads a document, the document gets stored in document_store 230. Document_store 230 also holds crucial metadata about each document, such as its status throughout the processing pipeline. As documents transition through different processing phases, their statuses in the document_store 230 get updated, ensuring real-time tracking of each document's progression. Document_store 230 organizes all documents via modules.

The context_store 240 is a specialized storage unit dedicated to preserving the contextual data and definitions provided by the users. Whenever the worker 250 is converting raw blocks into a narrative format, it queries the context_store 240 to retrieve any user-provided context that can enrich the generated narrative. Additionally, during Phase 2, any adjustments or enhancements to the context are stored in the context_store 240, ensuring that the document processing platform architecture 200 continually refines its understanding based on user interactions.

The worker 250 is essentially the orchestrator of the entire document processing pipeline. Upon receiving a document from the API 220, the worker 250 manages its extraction, status updates, narrative conversion, embedding generation, and storage, as described above with respect to FIG. 1. The worker 250 communicates with various components, including the OCR/text extraction software 260, the document_store 230, the context_store 240, and OpenAI and vector database of the LLM 270, ensuring the smooth flow of data between them and the efficient processing of each document.

The OCR/text extraction software 260 is employed by the worker 250 to extract text and data from the uploaded documents. The OCR/text extraction software 260 is responsible for pulling structured and unstructured data from various document formats. Through periodic status checks, the worker 250 may monitor the progress of the extraction. Once completed, the OCR/text extraction software 260 provides the worker 250 with raw data blocks from the document, which then undergo further processing.

The LLM 270 is a database specifically designed to handle vector data (e.g., via a pinecone database), making it integral for similarity-based operations. After generating the contextualized narrative for each block, the worker 250 communicates with the LLM 270 (e.g., OpenAI) to obtain embeddings for this data. These embeddings are then stored in a vector database of the LLM 270. The efficiency and optimized structure of the vector database of the LLM 270 ensure that vectorized data can be retrieved and compared quickly, which is used for operations like similarity calculation.

Sequence Diagram

Figure 3:
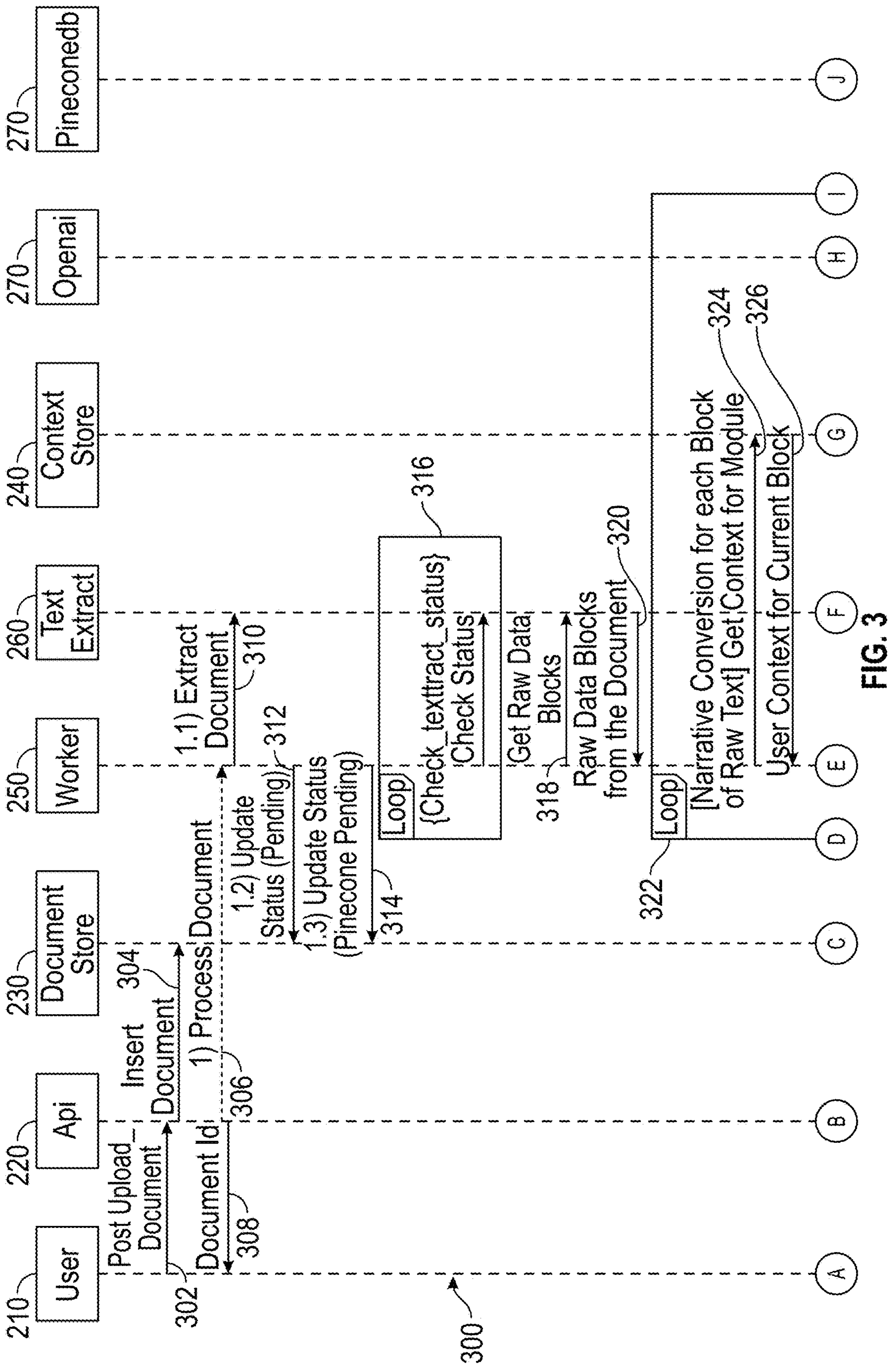
FIG. 3 is a sequence diagram illustrating document processing by the architecture of FIG. 2 in a sample configuration.
Figure 3:
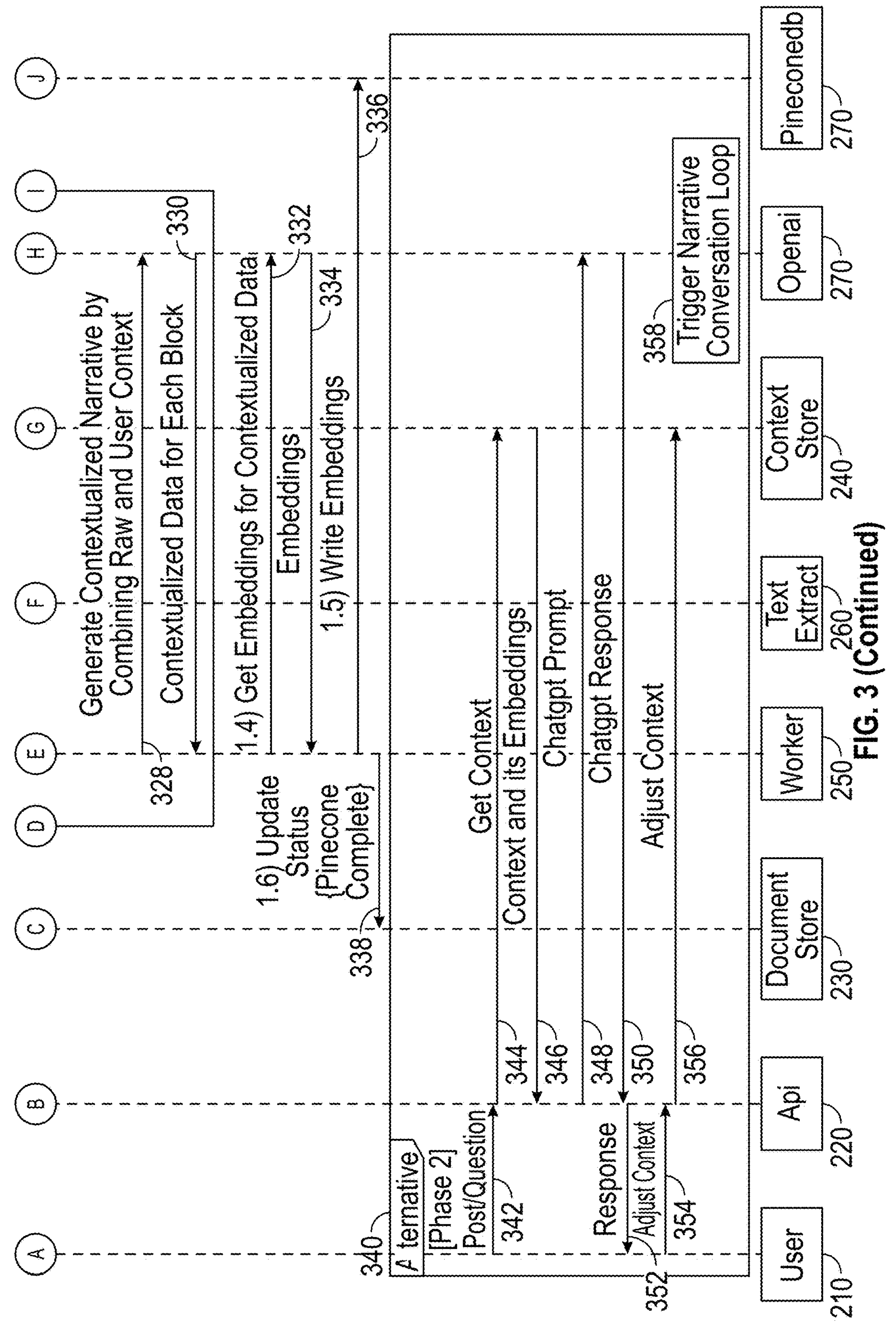

FIG. 3 is a sequence diagram 300 illustrating document processing by the document processing platform architecture 200 of FIG. 2 in a sample configuration. The sequence diagram 300 illustrates the respective processing phases including document upload and initial processing, text extraction, narrative conversion, embedding generation and storage, and question-answering, as will be described further below.

Document Upload and Initial Processing

A user 210 initiates the document processing journey by sending a POST/upload_document request 302 to the API 220. The API 220 immediately pushes the document into the document_store 230 at 304, securing a location for the uploaded document in document processing platform architecture 200. Simultaneously, the API 220 instructs the worker 250 at 306 to commence processing on this fresh document. Acknowledging the successful receipt and initiation of the document processing, the API 220 provides the user 210 with a unique document_id at 308.

Text Extraction Using OCR

To obtain text data from the uploaded document, the worker 250 engages with the OCR/text extraction software 260 at 310, instructing the OCR/text extraction software 260 to start the text extraction process. Concurrently, the worker 250 updates the status of the document within the document_store 230 to 'pending' at 312, signaling that the OCR extraction is currently in progress. A secondary status update occurs in the document_store 230 at 314, now changing the document's status to 'pinecone pending'. This hints at the subsequent phase involving pinecone database and embedding processing. While awaiting OCR completion, the worker 250 periodically pings OCR/text extraction software 260 at 316, tracking the extraction process's progress. Upon extraction completion, the OCR/text extraction software 260 interacts with the worker 250 at 318 and 320 to hand over blocks of raw text data extracted from the document to the worker 250.

Narrative Conversion Loop

For each block of raw text obtained from the document, a narrative conversion loop 322 is initiated to convert the raw data extracted from the document into a contextualized narrative. Within this narrative conversion loop 322, the worker 250 fetches relevant context for the current module from the context_store 240 at 324 and 326. With this context data on hand, the worker 250 then communicates with OpenAI of LLM 270 at 328, instructing the OpenAI of LLM 270 to generate a contextualized narrative by synergistically combining the raw data and the obtained user context. OpenAI of LLM 270 processes the information and returns a fully contextualized narrative for each data block to the worker 250 at 330.

Embedding Generation and Storage

Once all raw data blocks have been transformed into contextualized narratives, the worker 250 prompts the OpenAI of LLM 270 at 332 to produce embeddings for these narratives. OpenAI of LLM 270 processes the request and returns the relevant embeddings to the worker 250 at 334. The worker 250 then communicates with the pinecone database of the LLM 270 at 336, feeding these embeddings into the database for storage. Upon successful embedding storage, the worker 250 concludes this phase by updating the document status in the document_store 230 at 338 to 'pinecone complete'.

Question-Answering Phase

In the interactive question-answering phase 340, the user 210 submits a question related to the document via a post/question request 342 to the API 220. The API 220, to understand the context better, pulls relevant context and its associated embeddings from the context_store 240 at 344 and 346. Armed with this context, the API 220 then engages OpenAI's ChatGPT of LLM 270 at 348 with a prompt to generate a response. OpenAI of LLM 270 processes the prompt and returns an appropriate response to the API 220 at 350, which is then relayed to the user 210 at 352. If the user 210 finds the response unsatisfactory or wishes to refine it, the user 210 can adjust the context by sending a command to the API 220 at 354. The API 220 then communicates with the context_store 240 at 356 to make the necessary context adjustments. A notable action during this phase, as marked in the sequence diagram at 358, is the potential retriggering of the narrative conversion loop 322.

Thus, the document processing platform architecture 200 implements the flow diagram of the data query system 100 in accordance with the sequence diagram 300 to transform an uploaded unorganized document into an interactive question-answer system that enables the user to provide the requisite context to enable the document processing platform architecture 200 to return meaningful answers to the user's questions, not just responses driven by the structure and format of the original document. The document processing platform architecture 200 may become more accurate over time as the user provides additional context for additional questions. The document processing platform architecture 200 further enables the user to ask questions in a narrative form and to receive responses in a narrative form that is more useful to the user.

Example

As an example, a user may upload a dental insurance document. The document processing platform architecture 200 might auto-tag terms like "LEAT," "downcoding," "dental surface code 'I,'" or "gum mapping". The document processing platform architecture 200 may further use contextualization to associate "LEAT" with "Least expensive alternative treatment" and further define it as "A limitation in many dental plans which reduces benefits to the least expensive of other possible treatment options." The document processing platform architecture 200 may further use contextualization to defining "downcoding" as "A form of LEAT, where the plan may pay for a composite filling instead of a porcelain one." The document processing platform architecture 200 may further use contextualization to clarify that the "dental surface code 'I'" as referring to the "incisal, which is the bite edge of the front teeth (incisors and canines)." The user may then query the document to determine whether particular procedures are covered by the uploaded dental insurance document. Other applications of the technology described herein will be apparent to persons skilled in the art.

Sample Computer Platform

Figure 4:
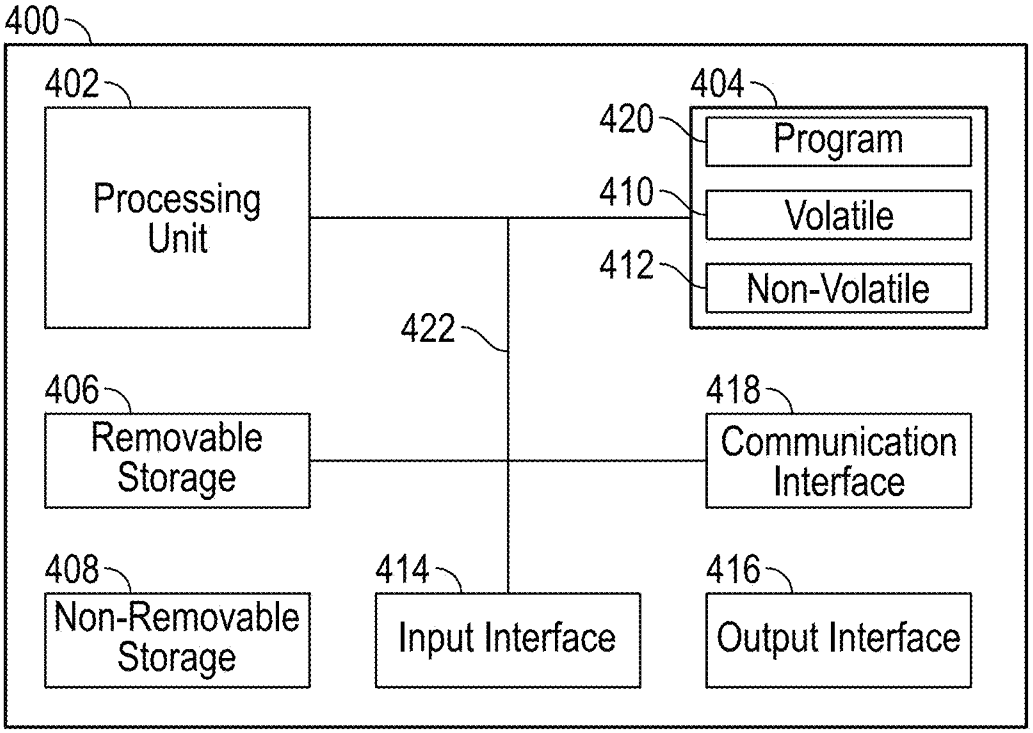
FIG. 4 is a block diagram illustrating circuitry for performing methods and implementing processing features according to the sample configurations.

FIG. 4 illustrates one example of a computing device in the form of a computer 400 that may include a processing unit 402, memory 404, removable storage 406, and non-removable storage 408 for implementing the processing features described above in a user client device and/or a server. Although the example computing device is illustrated and described as computer 400, the computing device may be in different forms in different configurations. For example, the computing device may comprise the user's computing device as well as a server. The computing device may be a smartphone, a tablet, smartwatch, or other computing device including the same or similar elements as illustrated and described with regard to FIG. 4. Devices, such as smartphones, tablets, and smartwatches, are generally collectively referred to as mobile devices or user equipment. Further, although the various data storage elements are illustrated as part of the computer 400, the storage may also or alternatively include cloud-based storage accessible via a network, such as the Internet or server-based storage.

Memory 404 may include volatile memory 410 and non-volatile memory 412. Computer 400 also may include, or have access to a computing environment that includes, a variety of computer-readable media, such as volatile memory 410 and non-volatile memory 412, removable storage 406 and non-removable storage 408. Computer storage includes random access memory (RAM), read only memory (ROM), erasable programmable read-only memory (EPROM) or electrically erasable programmable read-only memory (EEPROM), flash memory or other memory technologies, compact disc read-only memory (CD ROM), Digital Versatile Disks (DVD) or other optical disk storage, magnetic cassettes, magnetic tape, magnetic disk storage or other magnetic storage devices, or any other medium capable of storing computer-readable instructions.

Computer 400 may further include or have access to a computing environment that includes input interface 414, output interface 416, and a communication interface 418. Output interface 416 may include a display device, such as a touchscreen, that also may serve as an input device. The input interface 414 may include one or more of a touchscreen, touchpad, mouse, keyboard, camera, one or more device-specific buttons, one or more sensors integrated within or coupled via wired or wireless data connections to the computer 400, and other input devices.

The computer 400 may operate in a networked environment using communication interface 418 to connect to one or more remote computers. The remote computer may include a personal computer (PC), server, router, network PC, a peer device or other common network switch, or the like. The communication connection accessed via communication interface 418 may include a Local Area Network (LAN), a Wide Area Network (WAN), cellular, Wi-Fi, Bluetooth, Zigbee, or other networks. According to one configuration, the various components of computer 400 are connected with a system bus 410.

Computer-readable instructions stored on a computer-readable medium are executable by the processing unit 402 of the computer 400, such as a program 420. The program 420 in some configurations comprises software that, when executed by the processing unit 402, performs operations according to any of the configurations and models included herein. A hard drive, CD-ROM, and RAM are some examples of articles including a non-transitory computer-readable medium, such as a storage device. The terms computer-readable medium and storage device do not include carrier waves to the extent carrier waves are deemed too transitory. Storage can also include networked storage, such as a storage area network (SAN). Computer program 420 may be used to cause processing unit 402 to perform one or more methods or functions described herein.

It should be further understood that software including one or more computer-executable instructions that facilitate processing and operations as described above with reference to any one or all of steps of the disclosure may be provided in user portable electronic client devices to implement the features described herein. Alternatively, the software may be obtained and loaded into a server for implementing the features described herein through interaction with a user's client device. The software may be stored on a server for distribution over the Internet, for example.

Also, it will be understood by one skilled in the art that this disclosure is not limited in its application to the details of construction and the arrangement of components set forth in the above description or illustrated in the drawings. The configurations herein are capable of other configurations, and capable of being practiced or carried out in various ways. Also, it will be understood that the phraseology and terminology used herein is for the purpose of description and should not be regarded as limiting. The use of "including," "comprising," or "having" and variations thereof herein is meant to encompass the items listed thereafter and equivalents thereof as well as additional items.

The components of the illustrative devices, systems and methods employed in accordance with the illustrated configurations may be implemented, at least in part, in digital electronic circuitry, analog electronic circuitry, or in computer hardware, firmware, software, or in combinations of them. These components also may be implemented, for example, as a computer program product such as a computer program, program code or computer instructions tangibly embodied in an information carrier, or in a machine-readable storage device, for execution by, or to control the operation of, data processing apparatus such as a programmable processor, a computer, or multiple computers.

A computer program may be written in any form of programming language, including compiled or interpreted languages, and it may be deployed in any form, including as a stand-alone program or as a module, component, subroutine, or other unit suitable for use in a computing environment. A computer program may be deployed to be executed on one computer or on multiple computers at one site or distributed across multiple sites and interconnected by a communication network. Also, functional programs, codes, and code segments for accomplishing the systems and methods described herein may be easily construed as within the scope of the disclosure by programmers skilled in the art to which the present disclosure pertains. Method steps associated with the illustrative configurations may be performed by one or more programmable processors executing a computer program, code or instructions to perform functions (e.g., by operating on input data and generating an output). Method steps may also be performed by, and apparatus may be implemented as, special purpose logic circuitry, e.g., an FPGA (field programmable gate array) or an ASIC, for example.

The various illustrative logical blocks, modules, and circuits described in connection with the configurations disclosed herein may be implemented or performed with a general purpose processor, a digital signal processor (DSP), an ASIC, a FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. As used herein, a "plurality" comprises two or more.

Processors suitable for the execution of a computer program include, by way of example, both general and special purpose microprocessors, and any one or more processors of any kind of digital computer. Generally, a processor will receive instructions and data from a read-only memory or a random-access memory or both. The elements of a computer are a processor for executing instructions and one or more memory devices for storing instructions and data. Generally, a computer will also include or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example, semiconductor memory devices, e.g., electrically programmable read-only memory or ROM (EPROM), electrically erasable programmable ROM (EEPROM), flash memory devices, and data storage disks (e.g., magnetic disks, internal hard disks, or removable disks, magneto-optical disks, compact disc ROM (CD-ROM), or digital versatile disc ROM (DVD-ROM). The processor and the memory may be supplemented by, or incorporated in, special purpose logic circuitry.

Those of skill in the art understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those skilled in the art may further appreciate that the various illustrative logical blocks, modules, circuits, and algorithm steps described in connection with the configurations disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure. A software module may reside in random access memory (RAM), flash memory, ROM, EPROM, EEPROM, registers, hard disk, a removable disk, a CD-ROM, or any other form of storage medium known in the art. A sample storage medium is coupled to the processor such the processor may read information from, and write information to, the storage medium. In the alternative, the storage medium may be integral to the processor. In other words, the processor and the storage medium may reside in an integrated circuit or be implemented as discrete components.

As used herein, "machine-readable medium" means a device able to store instructions and data temporarily or permanently and may include, but is not limited to, random-access memory (RAM), read-only memory (ROM), buffer memory, flash memory, optical media, magnetic media, cache memory, other types of storage (e.g., EEPROM), and any suitable combination thereof. The term "machine-readable medium" should be taken to include a single medium or multiple media (e.g., a centralized or distributed database, or associated caches and servers) able to store processor instructions. The term "machine-readable medium" shall also be taken to include any medium, or combination of multiple media, which is capable of storing instructions for execution by one or more processors, such that the instructions, when executed by one or more processors cause the one or more processors to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" as used herein excludes signals per se.

What is claimed:

1. A method of querying a document, comprising:

receiving a document from a user;

processing the document to detect, extract, and auto-tag text and data from the document to generate context data for the document;

creating and presenting a narrative version of the extracted and auto-tagged text and data from the document in a user interface;

enabling the user to interact with the narrative version of the extracted and auto-tagged text and data from the document in the user interface by posing a user query of the document through the user interface against the whole document or specific blocks of the document to obtain a response and to add or refine context of the extracted and auto-tagged text and data in the form of a question-answer pair until a contextualized response to the user query of the document is obtained; and returning the contextualized response to the user query of the document to the user through the user interface, wherein enabling the user to interact with the narrative versions of the extracted and auto-tagged text and data from the document comprises:

selecting at least one artificial intelligence (AI) Assistant based on a current context of the document at runtime, the at least one AI assistant governing how responses are generated and presented in the user interface, the at least one AI assistant configured from configuration information including a field for storing organization-specific knowledge in a structured format, an array or list to hold rules defining AI assistant limitations, and a field for behavior instructions as situation-response pairs, and generating the contextualized response to the user query by:

retrieving the context data for the document, checking the user query against the rules defining AI assistant limitations before sending the user query to a large language model (LLM) that incorporates the organization-specific knowledge, fetching organization-specific knowledge relevant to the user query from the selected at least one AI assistant, generating an initial response to the user query with the LLM using the fetched organization-specific knowledge relevant to the user query, checking the initial response against the rules defining AI assistant limitations, refining the initial response by matching the user query against stored situation-response pairs of the selected AI assistant using vector embeddings and a similarity score, and when there is a match, using a matched situation-response pair to guide the contextualized response to the user query.

2. The method of claim 1, wherein processing the document to detect, extract, and auto-tag text and data from the document comprises processing the document with optical character recognition (OCR) software to convert at least portions of the text and data from the document into a character separated values (CSV) format and presenting processed text and data from the document as key-value pairs.

3. The method of claim 1, further comprising extracting metadata about the document and using the metadata in retrieval and organization of text and data extracted from the document.

4. The method of claim 1, wherein processing the document to detect, extract, and auto-tag text and data from the document comprises extracting keywords from each narrative block of the narrative version to ascertain main themes or subjects of each narrative block, auto-tagging keywords from each narrative block using the LLM, and storing the keywords with an associated narrative block of the narrative version in a database.

5. The method of claim 4, wherein enabling the user to interact with the narrative version of the extracted and auto-tagged text and data from the document in the user interface comprises the LLM enabling narrative block storage and user-provided context storage.

6. The method of claim 1, further comprising encoding the narrative version of the extracted and auto-tagged text and data from the document and user queries into vectors using embeddings from an embedding library and calculating cosine distances between vectors of the user queries and narrative blocks of the narrative version of the extracted and auto-tagged text and data from the document using a mathematical library to gauge similarity between the user queries and narrative blocks of the narrative version of the extracted and auto-tagged text and data from the document.

7. The method of claim 6, further comprising generating contextual prompts in the user interface for an interface to the LLM, wherein a most proximate narrative block, determined through the embeddings, is used as a contextual prompt to interact with the LLM to produce the contextualized response to the user query.

8. The method of claim 7, further comprising providing feedback-triggered context regeneration using a database for storing feedback and context and an embedding library for reassessing narrative blocks of the narrative version of the extracted and auto-tagged text and data from the document, wherein when the user inputs new context, all narrative blocks are evaluated in terms of their similarity to the user query posed through the user interface and relevant narrative blocks are subjected to context regeneration while other narrative blocks remain unaltered.

9. The method of claim 8, further comprising using the relevant narrative blocks as context for generating an answer to the user query posed through the user interface using the LLM.

10. The method of claim 1, wherein the document is organized as a module, further comprising uploading a new document relative to the module and enabling the user to ask a further user query against the new uploaded document with a context linked to the module to generate a further contextualized response.

11. The method of claim 1, wherein processing the document to detect, extract, and auto-tag text and data from the document comprises using at least one of a machine learning model, the LLM, or relational database management system associated with document modules to predict relevant information to extract for a new document and using each user query that a user asks against documents in a module to train a recommendation model that predicts kinds of user queries that users are likely to ask for the new document.

12. The method of claim 1, further comprising enabling, through the user interface, the user to at least one of input and organize domain knowledge; add, edit, and delete rules; provide and view feedback; or define situation-response pairs.

13. The method of claim 1, further comprising deploying a widget based on the contextualized response to the user query.

14. The method of claim 13, further comprising using the deployed widget to at least one of tweak properties including at least one of height, width, or color schemes or to automatically read data displayed on a display screen and to pull a document related to data in the read data that is of interest to the user.

15. A system for querying a document, comprising:

a document memory that stores documents;

a context memory that stores context data for the documents;

a user interface that enables a user to upload a document to the document memory;

a processor that executes text and data extraction software to process the uploaded document to detect, extract, and auto-tag text and data from the document to generate context data for the document;

a database comprising a large language model (LLM) comprising organization-specific knowledge that creates and presents a narrative version of the extracted and auto-tagged text and data from the document in the user interface;

a document processing system including a document processing processor adapted to enable the user to interact with the narrative version of the extracted and auto-tagged text and data from the document in the user interface by posing a user query of the document through the user interface against the whole document or specific blocks of the document to obtain a response and to add or refine context of the extracted and auto-tagged text and data in the form of a question-answer pair until a contextualized response to the user query of the document is obtained; and at least one artificial intelligence (AI) assistant selected based on a current context of the document at runtime, the at least one AI assistant governing how responses are generated and presented in the user interface, the at least one AI assistant configured from configuration information including a field for storing organization-specific knowledge in a structured format, an array or list to hold rules defining AI assistant limitations, and a field for behavior instructions as situation-response pairs, wherein the document processing system generates the contextualized response to the user query by:

retrieving the context data for the document, checking the user query against the rules defining AI assistant limitations before sending the user query to the LLM, fetching organization-specific knowledge relevant to the user query from the selected at least one AI assistant, generating an initial response to the user query with the LLM using the fetched organization-specific knowledge relevant to the user query, checking the initial response against the rules defining AI assistant limitations, refining the initial response by matching the user query against stored situation-response pairs of the selected AI assistant using vector embeddings and a similarity score, when there is a match, using a matched situation-response pair to guide the contextualized response to the user query, and returning the contextualized response to the user query of the document to the user through the user interface.

16. The system of claim 15, wherein the database comprising the LLM comprises a vector database adapted to handle vector data, wherein after the narrative version of the extracted and auto-tagged text and data is generated for each block of text and data from the document, the document processing system communicates with the LLM to obtain embeddings for the narrative version of the extracted and auto-tagged text and data and stores the embeddings in the vector database of the LLM.

17. The system of claim 15, wherein the text and data extraction software converts at least portions of the text and data from the document into a character separated values (CSV) format and presents processed text and data from the document as key-value pairs.

18. The system of claim 15, wherein the document memory further stores metadata about each document that is used in retrieval and organization of text and data extracted from each corresponding document.

19. The system of claim 15, wherein the text and data extraction software extracts keywords from each narrative block of the narrative version of the document to ascertain main themes or subjects of each narrative block, auto-tags keywords from each narrative block using the LLM and stores the keywords with an associated narrative block of the narrative version of the document in the database.

20. The system of claim 15, wherein the LLM encodes the narrative version of the extracted and auto-tagged text and data from the document and user queries into vectors using embeddings from an embedding library and calculates cosine distances between vectors of the user queries and narrative blocks of the narrative version of the extracted and auto-tagged text and data from the document using a mathematical library to gauge similarity between the user queries and narrative blocks of the narrative version of the extracted and auto-tagged text and data from the document.

21. The system of claim 20, wherein the LLM generates contextual prompts in the user interface for an interface to the LLM, wherein a most proximate narrative block, determined through the embeddings, is used as a contextual prompt when the user is interacting with the LLM to produce the contextualized response to the user query.

22. The system of claim 21, wherein the database stores feedback and context and an embedding library for reassessing narrative blocks of the narrative version of the extracted and auto-tagged text and data from the document, wherein when the user inputs new context via the user interface, all narrative blocks are evaluated in terms of their similarity to the user query posed through the user interface and relevant narrative blocks are subjected to feedback-triggered context regeneration while other narrative blocks remain unaltered.

23. The system of claim 22, wherein the relevant narrative blocks are used as context for generating an answer to the user query posed through the user interface using the LLM.

24. The system of claim 15, wherein the uploaded document is organized as a module in the document memory and the user interface enables the user to upload a new document relative to the module and to ask a further user query against the new uploaded document with a context linked to the module to generate a further contextualized response.

25. The system of claim 15, further comprising at least one of a machine learning model, the LLM, or relational database management system associated with document modules to predict relevant information to extract for a new document and a recommendation model that is trained by each user query that a user asks against documents in a document module, the recommendation model predicting kinds of user queries that users are likely to ask for the new document.

26. The system of claim 15, wherein the user interface is further adapted to enable the user to at least one of input and organize domain knowledge; add, edit, and delete rules; provide and view feedback; or define situation-response pairs.

27. The system of claim 26, wherein the user interface includes a web-based dashboard adapted to implement at least one of a rich text editor that enables the user to input and organize domain knowledge, create a form interface where the user can add, edit, and delete rules, provide and view feedback, or implement behavior instructions using a form where the user defines situation-response pairs.

28. The system of claim 27, further comprising that a backend server that supports functionality of the user interface, the backend server comprising a parser that converts user-input knowledge into a structured, searchable format and a vector embedding system that creates searchable representations of the domain knowledge.

29. The system of claim 27, further comprising a backend server that supports functionality of the user interface, the backend server comprising a pre-processing module that checks user queries against defined rules before passing the user queries to the at least one AI assistant, and a post-processing module that validates the at least one AI assistant's responses against the defined rules before sending the at least one AI assistant's responses to the user.

30. The system of claim 27, further comprising a backend server that supports functionality of the user interface, the backend server comprising a reinforcement learning model that adjusts the at least one AI assistant's behavior based on accumulated feedback.

31. The system of claim 27, further comprising a backend server that supports functionality of the user interface, the backend server comprising a pre-trained language model that converts each defined situation in the behavior instructions into a vector embedding and stores situation embeddings along with corresponding desired responses in a configuration file of the at least one AI assistant.

32. The system of claim 31, wherein when a behavior instruction relevant to a defined situation is found, it is used to guide the LLM in generating an appropriate response by using the behavior instruction relevant to the defined situation as a prefix or prompt for the LLM or as a post-processing step to refine output of the LLM.

33. The system of claim 15, further comprising a contextual widget that is deployed based on the contextualized response to the user query.

34. The system of claim 33, wherein the contextual widget enables the user to at least one of tweak properties including at least one of height, width, or color schemes or to automatically read data displayed on a display screen and to pull a document related to data in the read data that is of interest to the user.

35. A non-transitory computer readable medium comprising instructions that, when executed by one or more processors, query a document by performing operations comprising:

receiving a document from a user;

processing the document to detect, extract, and auto-tag text and data from the document to generate context data for the document;

creating and presenting a narrative version of the extracted and auto-tagged text and data from the document in a user interface;

enabling the user to interact with the narrative version of the extracted and auto-tagged text and data from the document in the user interface by posing a user query of the document through the user interface against the whole document or specific blocks of the document to obtain a response and to add or refine context of the extracted and auto-tagged text and data in the form of a question-answer pair until a contextualized response to the user query of the document is obtained; and returning the contextualized response to the user query of the document to the user through the user interface, wherein enabling the user to interact with the narrative versions of the extracted and auto-tagged text and data from the document comprises:

selecting at least one artificial intelligence (AI) Assistant based on a current context of the document at runtime, the at least one AI assistant governing how responses are generated and presented in the user interface, the at least one AI assistant configured from configuration information including a field for storing organization-specific knowledge in a structured format, an array or list to hold rules defining AI assistant limitations, and a field for behavior instructions as situation-response pairs, and generating the contextualized response to the user query by:

retrieving the context data for the document, checking the user query against the rules defining AI assistant limitations before sending the user query to a large language model (LLM) that incorporates the organization-specific knowledge, fetching organization-specific knowledge relevant to the user query from the selected at least one AI assistant, generating an initial response to the user query with the LLM using the fetched organization-specific knowledge relevant to the user query, checking the initial response against the rules defining AI assistant limitations, refining the initial response by matching the user query against stored situation-response pairs of the selected AI assistant using vector embeddings and a similarity score, and when there is a match, using a matched situation-response pair to guide the contextualized response to the user query.

* * * * *